US012320342B2

(12) United States Patent
Engrand et al.

(10) Patent No.: US 12,320,342 B2
(45) Date of Patent: Jun. 3, 2025

(54) HYDRAULIC MACHINE COMPRISING BEARINGS FOR SUPPORTING THE ROTATING COMPONENT

(71) Applicant: POCLAIN HYDRAULICS INDUSTRIE, Verberie (FR)

(72) Inventors: Julien Engrand, Verberie (FR); Gilles Grillon, Verberie (FR); Stéphane Bernard Quertelet, Verberie (FR); Jérémy Gérard Respecte, Verberie (FR); Philippe Lucienne, Verberie (FR); Patrick Jalabert, Verberie (FR); Adam Frey, Verberie (FR); Scott Glodowski, Verberie (FR)

(73) Assignee: POCLAIN HYDRAULICS INDUSTRIE, Veberie (FR)

( * ) Notice: Subject to any disclaimer, the term of this patent is extended or adjusted under 35 U.S.C. 154(b) by 207 days.

(21) Appl. No.: 17/927,444

(22) PCT Filed: Jun. 8, 2021

(86) PCT No.: PCT/FR2021/051024
§ 371 (c)(1),
(2) Date: Nov. 23, 2022

(87) PCT Pub. No.: WO2021/250348
PCT Pub. Date: Dec. 16, 2021

(65) Prior Publication Data
US 2023/0175496 A1    Jun. 8, 2023

(30) Foreign Application Priority Data
Jun. 9, 2020  (FR) ........................................ 2006001

(51) Int. Cl.
*F04B 1/047*  (2020.01)
*F03C 1/047*  (2006.01)
(Continued)

(52) U.S. Cl.
CPC .............. *F04B 1/047* (2013.01); *F03C 1/047* (2013.01); *F04B 1/107* (2013.01); *F04B 1/1071* (2013.01); *F16C 33/046* (2013.01)

(58) Field of Classification Search
CPC ........ F04B 1/047; F04B 1/1071; F04B 1/107; F03C 1/047
See application file for complete search history.

(56) References Cited

U.S. PATENT DOCUMENTS 1,768,460 A * 6/1930 Boden ..................... F16C 17/10
384/571
3,511,131 A * 5/1970 Kress .................... F03C 1/0431
91/472
(Continued)

FOREIGN PATENT DOCUMENTS

EP    0191674 A1    8/1986
FR    2967201 A1    5/2012
(Continued)

OTHER PUBLICATIONS

PCT Search Report in related, co-pending PCT Application No. PCT/FR2021/051024, mailedOct. 8, 2021.
(Continued)

*Primary Examiner* — Dustin T Nguyen
(74) *Attorney, Agent, or Firm* — Thomas | Horstemeyer, LLP

(57) ABSTRACT

The rotating hydraulic machine (102) comprises: —a housing (10), —a shaft (20) movably mounted relative to the housing about an axis, —an apron (24) rigidly connected to the shaft and extending around at least a portion of the housing, —a cam (12) rigidly connected to either the housing or the shaft, —a cylinder block (42) rotationally connected to the other of either the housing or the shaft, the cylinder block comprising pistons capable of engaging with the cam to produce a relative rotation between the shaft and (Continued)

the housing, —first and second guide bearings (28) each bearing directly on the housing and the apron, and —at least a third guide bearing (37) bearing directly on the housing and the cylinder block.

3 Claims, 7 Drawing Sheets

(51) Int. Cl.
    *F04B 1/107*     (2020.01)
    *F04B 1/1071*     (2020.01)
    *F16C 33/04*     (2006.01)

(56) References Cited

U.S. PATENT DOCUMENTS

| | | | | |
|---|---|---|---|---|
| 3,913,454 | A * | 10/1975 | Nelson | F16D 55/40 |
| | | | | 417/273 |
| 6,186,262 | B1 * | 2/2001 | Mann | F16D 55/02 |
| | | | | 180/370 |
| 6,357,558 | B1 * | 3/2002 | Case | F03C 1/0447 |
| | | | | 188/170 |
| 6,443,047 | B1 * | 9/2002 | Cunningham | F04B 1/0439 |
| | | | | 91/491 |
| 7,008,343 | B2 * | 3/2006 | Nagasugi | F16H 1/46 |
| | | | | 475/83 |
| 8,225,707 | B2 * | 7/2012 | Heilig | F04B 1/1072 |
| | | | | 92/128 |
| 8,272,483 | B2 * | 9/2012 | Sakahara | F16D 65/54 |
| | | | | 188/196 P |
| 8,662,259 | B2 * | 3/2014 | Vidal | F16D 59/02 |
| | | | | 188/170 |
| 9,446,637 | B2 * | 9/2016 | Knapke | B60C 23/0039 |
| 9,777,573 | B2 * | 10/2017 | Just | F03C 1/047 |
| 2015/0273958 | A1 * | 10/2015 | Stoychev | B60C 23/00363 |
| | | | | 152/415 |

FOREIGN PATENT DOCUMENTS

FR     3014940 A1     6/2015
WO     0216769 A1     2/2002

OTHER PUBLICATIONS

French Search Report in related, co-pending French Application No. FR 2006001, mailed Feb. 25, 2021.

* cited by examiner

HYDRAULIC MACHINE COMPRISING BEARINGS FOR SUPPORTING THE ROTATING COMPONENT

CROSS REFERENCE TO RELATED APPLICATIONS

This application is the 35 U.S.C. § 371 national stage application of PCT Application No. PCT/FR2021/051024, filed Jun. 8, 2021, which application claims the benefit of French Application No. FR 2006001 filed Jun. 9, 2020, both of which are hereby incorporated by reference herein in their entireties.

FIELD OF THE INVENTION

The invention relates to the hydraulic machines.

STATE OF THE ART

Many types of hydraulic machines are known. Such a machine essentially comprises for example five assemblies: a casing, a shaft, an assembly forming a motor or a pump disposed between the casing and the shaft, bearings for guiding in relative rotation the shaft and the casing and a brake.

The casing is intended to be fixed to the frame of a machine or a vehicle. It comprises a multi-lobe cam sandwiched between two side elements of the casing.

The shaft supports a power take-off adapted to carry an accessory which must be driven in rotation, for example the rim of a wheel or any other equipment, in the case where the machine constitutes a motor and delivers a drive torque on the accessory. In the case where it constitutes a pump, the power take-off receives a mechanical drive motor torque applied to the entrance of the machine.

The assembly forming a motor or a pump is for example a radial-piston assembly. It comprises a distributor, a cylinder block which has radial cylinders each housing a piston each carrying a roller in abutment against the cam.

When the distributor cyclically applies a pressurized fluid inside the cylinders, the biasing of the pistons and the rollers associated on the cam drives the cylinder block in rotation with respect to the cam and consequently with respect to the casing. Since the cylinder block is linked in rotation with the central element of the shaft, the shaft is driven in rotation by the fluid pressure applied by the distributor. The machine then constitutes a motor. When, on the contrary, a mechanical force is applied by the power take-off on the shaft in the direction of a rotational drive with respect to the casing, the displacement of the rollers and the pistons with respect to the lobes of the cam induces a variation in the volume of the cylinders and consequently applies a fluid pressure on the distributor. The machine then operates as a pump.

This machine is reversible, and therefore operates either as a pump or as a motor, and can also rotate in two directions of rotation. Such a hydraulic machine can therefore be in four different situations, which define four quadrants of pressure value and flow direction: forward gear, in traction or retention, and reverse gear, in traction or retention.

The brake is formed of a stack of disks alternately linked in rotation, some to the shaft and others to the casing. The disks are biased in mutual in abutment, in the braking position, by an elastic member. A counteracting force to the elastic member can be applied in a control chamber in order to place the brake in the brake release position.

A particular known configuration is a configuration in which the machine comprises a sleeve rigidly secured to the shaft and extending around at least a portion of the casing. This sleeve thus forms an extension of the shaft extending from an axial end of the latter to surround the portion of the casing. This assembly rotates as a single block. In addition, the machine comprises two bearings for guiding the rotation of the shaft with respect to the casing, generally composed of opposite tapered bearings forming a hub, that is to say allowing the take-up of radial and axial forces, each directly in abutment against the casing and the sleeve. When the hydraulic machine is intended to drive a machine member, such as a wheel or a track sprocket, the bearings of the motor are essentially dimensioned to ensure the functions of transmission of the torque, but also of support of the weight of the machine during the rolling, or to cope with the tension jolts of the track. For these reasons, the dimensioning of the rollings forming bearings is proportional to these forces, and the rollings are advantageously located as close as possible to the power take-off forming the wheel or track sprocket attachment. This mounting is advantageous because it is very robust to cope with the track rolling or traction forces, and gives good resistance and a good lifetime of the hub function with respect to the track rolling or drive biasings.

Although this configuration is interesting, it has drawbacks.

Thus, it is common for the shaft to be relatively long so that it tends to bend.

In addition, the cylinder block in which the pistons are moving tends to bias the shaft by producing parasitic forces which disturb the rolling bearings of the motor. These parasitic forces result from the alternate thrusts of the pistons on the cam and are therefore perpendicular to the axis. Moreover, particularly in the case of distributors with planar distribution, the distributor generates axial thrusts which are transmitted to the cylinder block and then to the shaft in the direction opposite to the cylinder block.

The parasitic forces of the pistons are therefore transferred in bending to the shaft and to the rollings.

The parasitic forces of the distributor are particularly transferred to the rolling furthest from the distributor. They also tend to interfere with the clamping of the two tapered bearings, called preload or prestress of the rollings, which is used to mount two opposite tapered bearings. This prestress is ensured by the clamping of the two inner races of the rollings on the shaft, achieved by the wedging of stacked elements on the side of the race opposite to the distributor, mounted on splines and held in position by a retaining ring. This prestress is provided to cope with the rolling and drive forces so that the rollings must always remain in abutment. An axial force that exceeds the preload induces a distance of the rollings, a loss of contact of one of the rollings, the appearance of a clearance in the guiding of the shaft and rapid destruction of the rollings. A parasitic axial force coming from the thrust of the distributor must be compensated by an increase in the prestress. However, an increase in the prestress generates a jamming, and therefore a loss of rotational efficiency as well as a reduction in the lifetime.

In addition, the rolling bearings of the motor which are normally dedicated to the transmission force of the machine receive these parasitic forces. Therefore, either some of the parts, in particular these bearings, have to become more solid which penalizes the total volume of the machine, or the performances of the latter have to be reduced to avoid breaking a part.

One aim of the invention is to improve the aforementioned particular configuration by overcoming at least one of these drawbacks.

DISCLOSURE OF THE INVENTION

To this end, a rotating hydraulic machine is provided, comprising:
- a casing,
- a shaft rotatably mounted with respect to the casing,
- a sleeve rigidly secured to the shaft and extending around at least a portion of the casing,
- a cam rigidly secured to one among the casing and the shaft,
- a cylinder block secured in rotation to the other among the casing and the shaft, the cylinder block comprising pistons able to cooperate with the cam to generate a relative rotation between the shaft and the casing,
- first and second guide bearings each directly in abutment against the casing and the sleeve, and
- at least a third guide bearing directly in abutment against the casing and the cylinder block.

Thus, the third bearing ensures that the casing takes up at least part of the forces generated or transmitted by the cylinder block. These forces are therefore no longer transmitted directly to the shaft or to the first and second bearings. These are, depending on the configuration of the additional bearing(s), axial forces with reference to an axis of the shaft, radial forces or both. With this mounting, the first and second bearings therefore remain dedicated to the transmission force of the machine. Since these bearings are no longer disturbed by all or part of the parasitic forces generated by the cylinder block and the distributor, the robustness of the motor is enhanced. In particular, the robustness of these bearings at equal volume is no longer threatened. Or it is possible to reduce their volume, and therefore reduce the space requirement of the motor without compromising its performance. In addition, in the event of take-up of the axial forces, it is no longer necessary to compensate for a parasitic axial force coming from the thrust of the distributor by an increase in the prestress on the first and second bearings.

In one embodiment, the first, second and third bearings are the only bearings able to guide in the machine a rotation of the shaft with respect to the casing.

Thus, no additional bearing is provided in addition to these three bearings.

In another embodiment, the machine further comprises a fourth bearing directly in abutment against the casing and the cylinder block.

It can be provided that the third bearing or at least one of the third and fourth bearings is in abutment:
- against the casing and the cylinder block along a direction of an axis of the shaft;
- against the casing and the cylinder block along a direction radial to the axis; or
- against the casing and the cylinder block along the direction of the axis and along a direction radial to the axis.

In one embodiment, the third bearing is in abutment against the casing and the cylinder block along a direction of an axis of the shaft, and the fourth bearing is in abutment against the casing and the cylinder block along a direction radial to the axis.

Thus these two bearings ensure the take-up of the axial and radial forces respectively.

It can be provided that the third bearing or at least one of the third and fourth bearings comprises a rolling.

For example, the rolling is a roller or needle bearing.

In one configuration, the rollers or the needles extend along a plane perpendicular to an axis of the shaft.

This configuration is particularly effective and space saving for a take-up of the parasitic axial forces. The rolling then forms an axial stop.

It can be provided that the third bearing or at least one of the third and fourth bearings comprises a bushing.

Unlike a rolling, which comprises parts movable with respect to each other, the bushing does not. It is a solid against the two main faces from which the casing and the cylinder block come in abutment.

For example, the bushing is cylindrical.

In another example, the bushing is frustoconical.

Such a bushing allows a take-up of axial and radial forces. It tends towards an abutment normal to the trajectory of the cylinder block when it is subjected to a parasitic force, which allows optimizing the contact pressures of the casing and of the cylinder block on the bushing. It allows a strong reduction in the axial offset, and makes it possible to adapt the shapes of the casing and the cylinder block in order to further improve the distribution of the contact pressures on the bushing.

It can be provided that the bushing has a slot extending from a first axial end edge of the bushing to a second axial end edge of the bushing.

This slot allows good adaptation of the bushing to the housing defined between the casing and the cylinder block, in particular by authorizing a modification of the diameter of the bushing.

It can also be provided that the bushing comprises at least one element for blocking in rotation the bushing with respect to a part of the machine.

Advantageously, the bushing has at least one recess passing through a thickness of the bushing and intercepting at most one end edge of the bushing.

One or several recesses of this type promote the circulation of a lubricating liquid on the two faces of the bushing and its good distribution.

In one embodiment, the third bearing comprises a roller or needle bearing in which the rollers or the needles extend along a plane perpendicular to an axis of the shaft, and the fourth bearing comprises a cylindrical bushing.

This embodiment therefore combines the axial stop in the form of a rolling and the bushing for the take-up of the radial forces. It is particularly space-saving.

It can also be provided that the cylinder block, the casing and at least one of the bearings are shaped to center the cylinder block with respect to the casing in a form-fitting manner independently of the shaft.

It can be provided that the cylinder block is slidably mounted on splines of the shaft.

There is also provided according to the invention a machinery, forming a vehicle or a construction machinery, equipped with at least one hydraulic machine according to the invention.

DESCRIPTION OF THE FIGURES

Embodiments of the invention will now be presented by way of non-limiting examples based on the drawings in which.

FIRST EMBODIMENT

Figure 1:
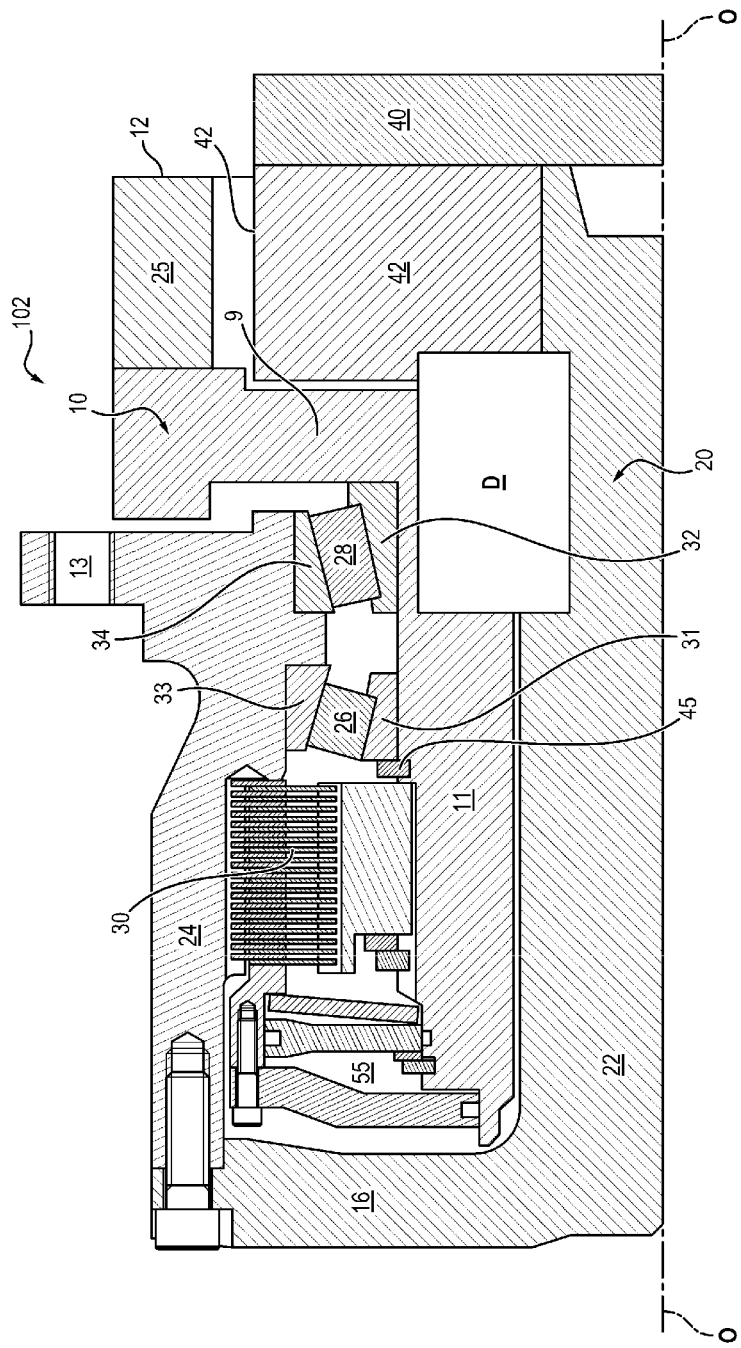
FIG. 1 is a partial axial-sectional view of a machine according to a first embodiment of the invention.

The hydraulic machine 102 according to the first embodiment of the invention, illustrated in FIGS. 1 to 6, is symmetrical of revolution and centered on an axis O-O. It comprises a casing 10, a shaft 20, an assembly forming a motor or a pump 25 disposed between the casing 10 and the shaft 20, bearings 26, 28 for guiding the shaft 20 in relative rotation with respect to the casing 10 and a brake 30.

The casing 10 is intended to be fixed to the frame of a machine or a vehicle.

Figure 2:
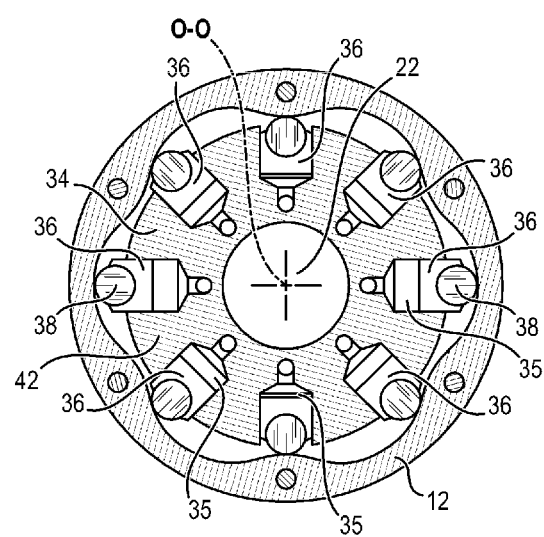
FIG. 2 is a cross-sectional view of the machine of FIG. 1 in a plane perpendicular to the axis comprising the cylinder block and the pistons.

The assembly 25 comprises a multiple-lobe cam 12 illustrated in FIG. 2, sandwiched between two side elements of the casing, one of which is located on the right in FIG. 1 and is not visible.

The shaft 20 is arranged to support a power take-off adapted to carry an accessory which must be driven in rotation, for example the rim of a wheel or any other equipment, in the case where the machine constitutes a motor. In the case where it constitutes a pump, the power take-off receives a mechanical motor torque applied to the entrance of the machine.

Figure 3:
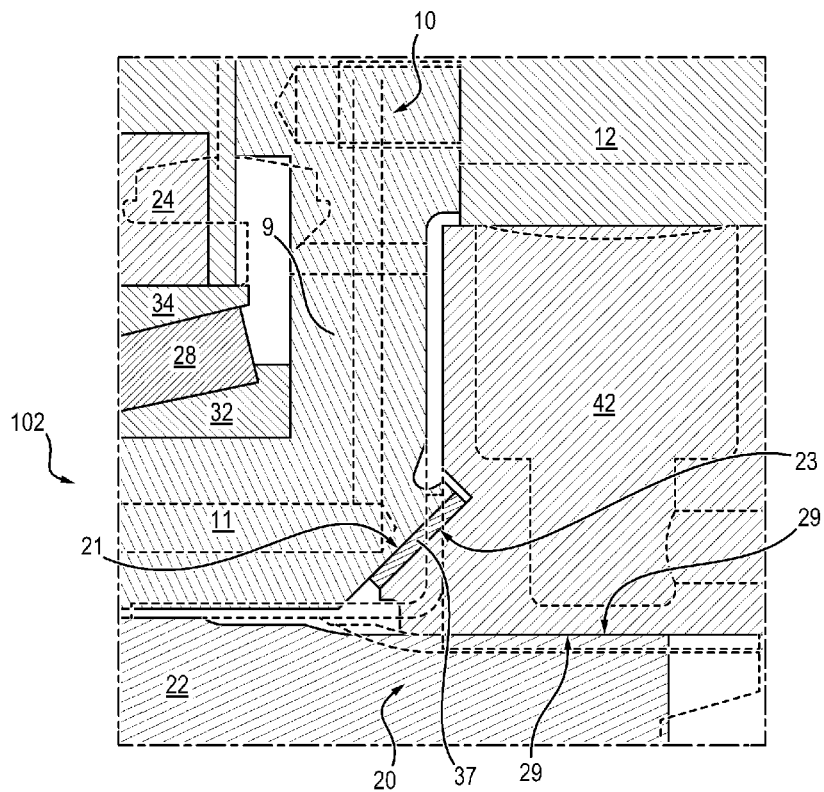
FIG. 3 is a larger scale view of the detail D of FIG. 1.

The assembly forming a motor or a pump 25 is a radial-piston assembly 36. It comprises a distributor 40 and a cylinder block 42 which has radial cylinders 35 housing the respective pistons 36, as illustrated in FIG. 2. Each piston carries a roller 38 in abutment against the cam 12 secured to the casing. The number of cylinders and therefore of pistons differs from the number of lobes of the cam 12. As in the machine of this mode the cam is radially external, the cylinders of the cylinder block located radially inside the cam open out radially outwards, facing the cam. The distributor 40 is supplied with fluid via an element, known and not illustrated, which forms a cover for the casing and a fitting for supplying the distributor. As illustrated in FIG. 3, the cylinder block 42 is linked in rotation with the shaft 20 by longitudinal splines 29 of the cylinder block and of the shaft in mutual engagement so that the cylinder block is here slidably mounted on the shaft along the axial direction.

In a manner known per se, when the distributor 40 cyclically applies a pressurized fluid inside the cylinders 35, the biasing of the pistons 36 and of the rollers 38 associated on the cam 12 causes the cylinder block 42 in rotation with respect to the cam and consequently with respect to the casing. The shaft is thus driven in rotation by the pressure of the fluid. In this case, the machine constitutes a motor.

When, on the contrary, a mechanical force is applied by the power take-off on the shaft 20 in the direction of a rotational drive with respect to the casing 10, the displacement of the rollers and the pistons with respect to the lobes of the cam induces a variation in the volume of the cylinders and consequently applies a fluid pressure on the distributor. The machine then operates as a pump. This machine is thus reversible, and therefore operates either as a pump or as a motor, and can also rotate in two directions of rotation.

The shaft 20 has a central area or hub 22 intercepted by the axis O-O. It also comprises an axial cylindrical extension remote from the axis, forming a sleeve 24 or a crown and connected to the hub by a radial connection disk 16 extending to an axial end of the shaft, on the left in FIG. 1. The sleeve 24 therefore extends to the right in the figure from this disk.

The casing 10 for its part has a cylindrical axial extension 11 extending in the direction of the left in FIG. 1, from a radial extension 9 connected to the cover not illustrated. This axial extension 11 surrounds the hub 22 of the shaft 20 and extends facing the latter along the direction radial to the axis. It is therefore interposed in the radial direction between the hub 22 and the sleeve 24.

It can therefore be seen that, in this configuration given by way of example, the sleeve 24 is rigidly secured to the hub 22 of the shaft and extends around the extension 11 of the casing. The cam 12 is rigidly secured to the casing and the cylinder block 42 secured in rotation to the shaft 20.

The machine comprises a brake 30 which is of the disk brake type. It is formed of a stack of disks connected in rotation, some to the shaft 20 and others to the casing 10 following a spatial alternation along the longitudinal axis O-O. Each of the disks is formed of a washer. Their rotational connection to the casing and to the shaft respectively can be formed for example by the engagement of ribs provided on the radially outer or alternatively radially inner periphery of the disks in complementary splines or grooves formed oppositely on the sleeve 24 of the shaft and the casing extension 11 associated respectively. As a variant, it is possible to provide an intermediate rotational connection part interposed between the disks and one of the casing 10 or of the shaft 20.

The machine has a brake release chamber 55 placed opposite the cylinder block 42 in the axial direction with respect to the stack of disks. It is thus located in FIG. 1 to the left of this stack. The brake 30 is disposed in this case at an axial end of the machine opposite to the distributor 40 with respect to the cylinder block 42. At rest, the disks are biased in mutual abutment by a spring, so that the shaft 20 and the casing 10 are immobilized with respect to each other in a braking situation. If a spacing is given to the disks by filling the brake release chamber 55 with fluid to counter the biasing of the spring, the rotation of the shaft with respect to the casing is authorized.

To limit the axial space requirement of the machine, the power take-off 13 can be provided on the outside of an element radially external to the sleeve 24, as in the case of FIG. 1. According to one variant, the power take-off force is placed axially on a disk transverse to the axis O-O.

The machine of FIG. 1 comprises two guide bearings, namely a first bearing 26 and second bearing 28, each directly in abutment against the extension 11 and the sleeve 24. The two bearings are here each in abutment against an axial end area of the sleeve, against its face oriented in the direction of the axis and of the extension 11 of the casing. They are here also in abutment against a middle portion of the extension 11 of the shaft, against a face oriented in the direction opposite to the axis, in the direction of the sleeve 24.

These are here frustoconical roller bearings, but as a variant, cylindrical roller bearings or ball bearings, for example, could be provided. The axes of the rolling elements are inclined with respect to the axis O-O and form a truncated cone in each rolling. Thus, for the bearing 26 located closest to the brake 30, this axis intercepts the main axis O-O so that the bearing is between the brake 30 and this point of intersection. Conversely, for the bearing 28 located closest to the distributor 40, the axis of the rolling elements intercepts the main axis so that the bearing 28 is between the distributor 40 and the point of intersection.

Each of the bearings comprises an inner race 31, 32 and an outer race 33, 34. The inner race 31 of the left rolling is in axial abutment against a retaining ring 45 fixed to the extension 11 of the casing, in the direction opposite to the distributor 40 while its outer race 33 is in axial abutment against a shoulder of the sleeve 24 in the direction of the distributor 40. The inner race 32 of the right bearing is in axial abutment against the radial extension 9 of the casing in the direction of the distributor while its outer race 34 is in axial abutment against a shoulder of the sleeve 24 in the opposite direction. In the configuration illustrated, and although other configurations can be envisaged, the two bearings are facing each other along the axial direction.

Figure 4:
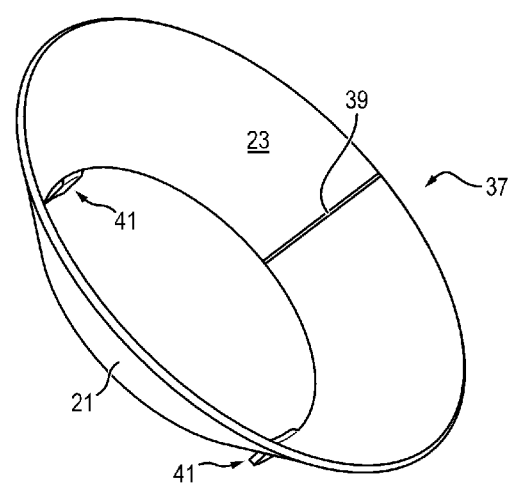
FIGS. 4 and 5 are two perspective views of the bushing of the machine of FIG. 3.
Figure 5:
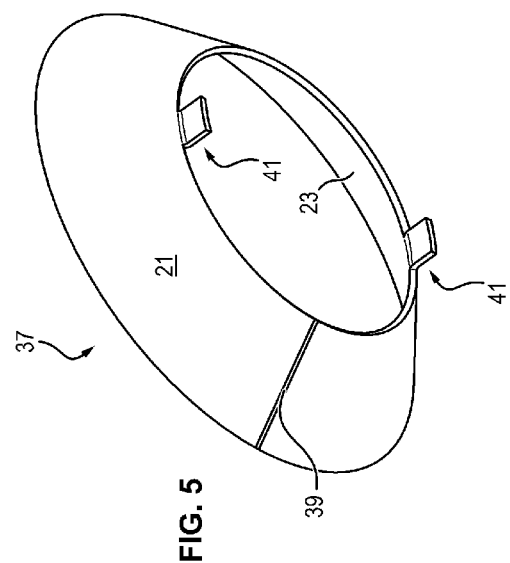
Figure 7:
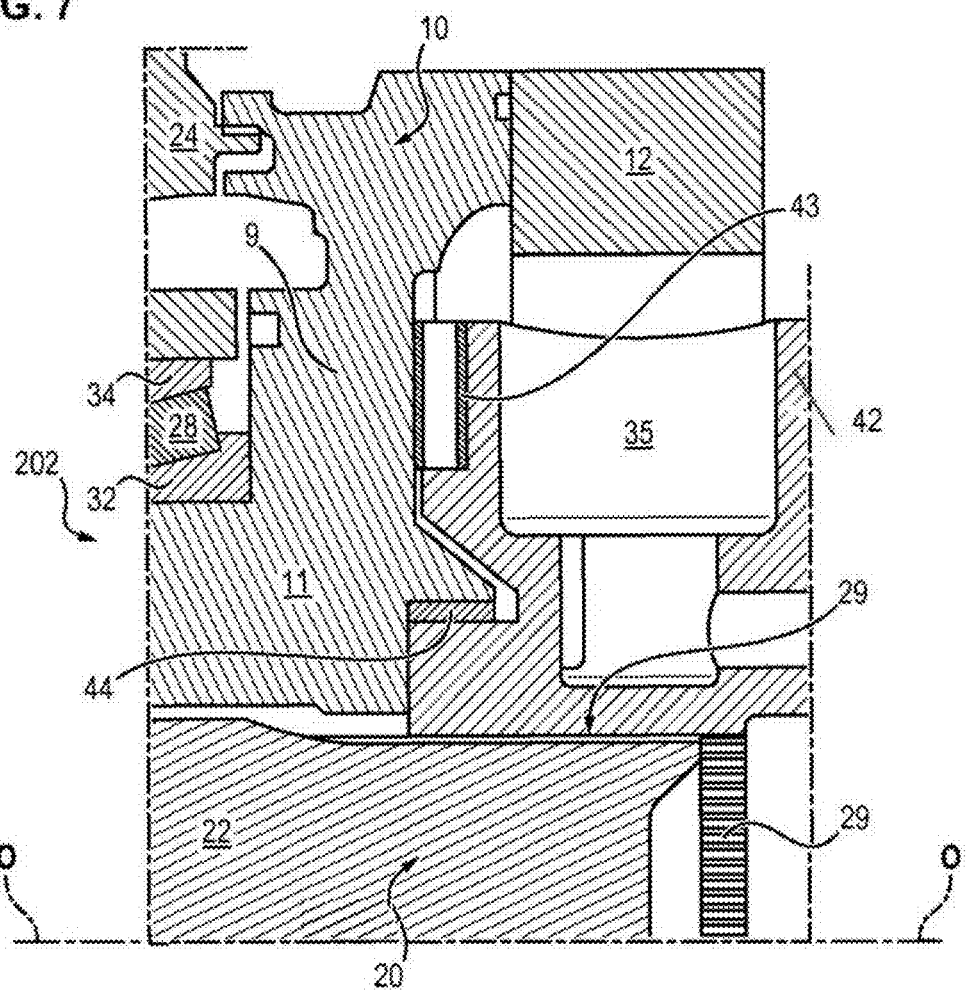
FIG. 7 is a view similar to FIG. 3 showing a machine according to a second embodiment of the invention.
Figure 8:
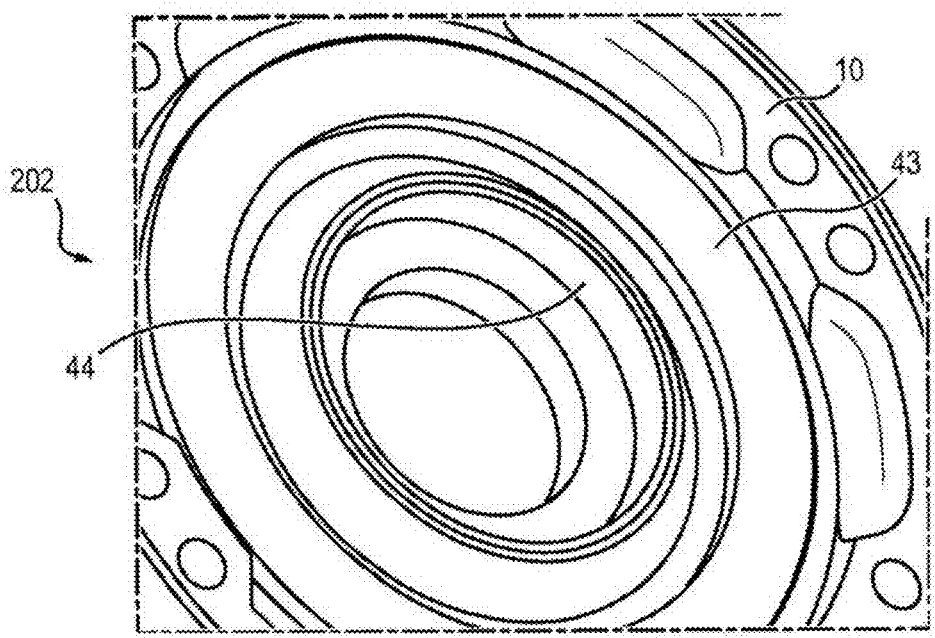
FIGS. 8 and 9 are perspective views of the machine of the previous figure in which the cylinder block has been removed and therefore in which the casing can be seen.
Figure 9:
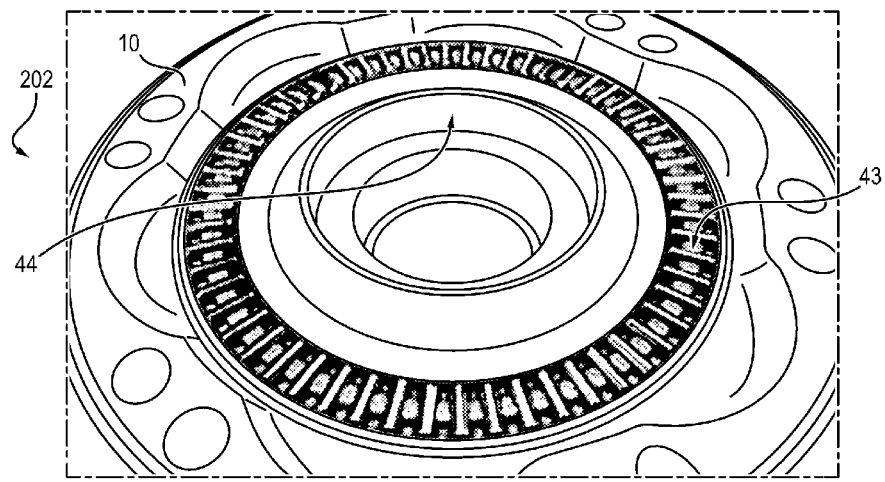
Figure 10:
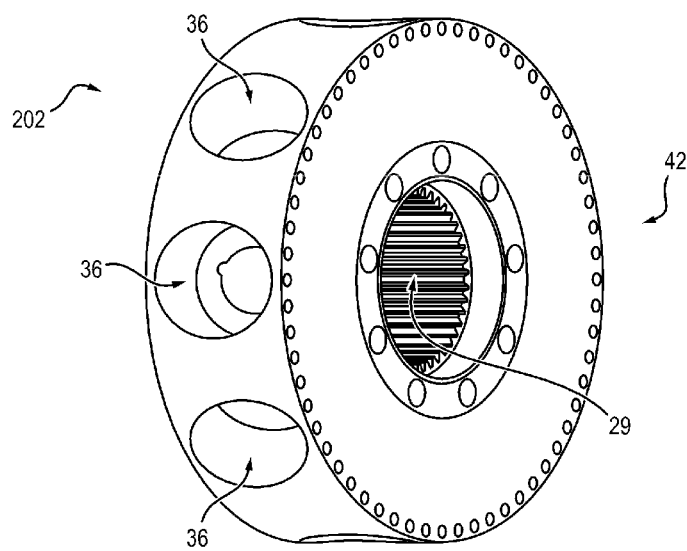
FIGS. 10 and 11 are perspective views showing two respective faces of the cylinder block of the machine.
Figure 11:
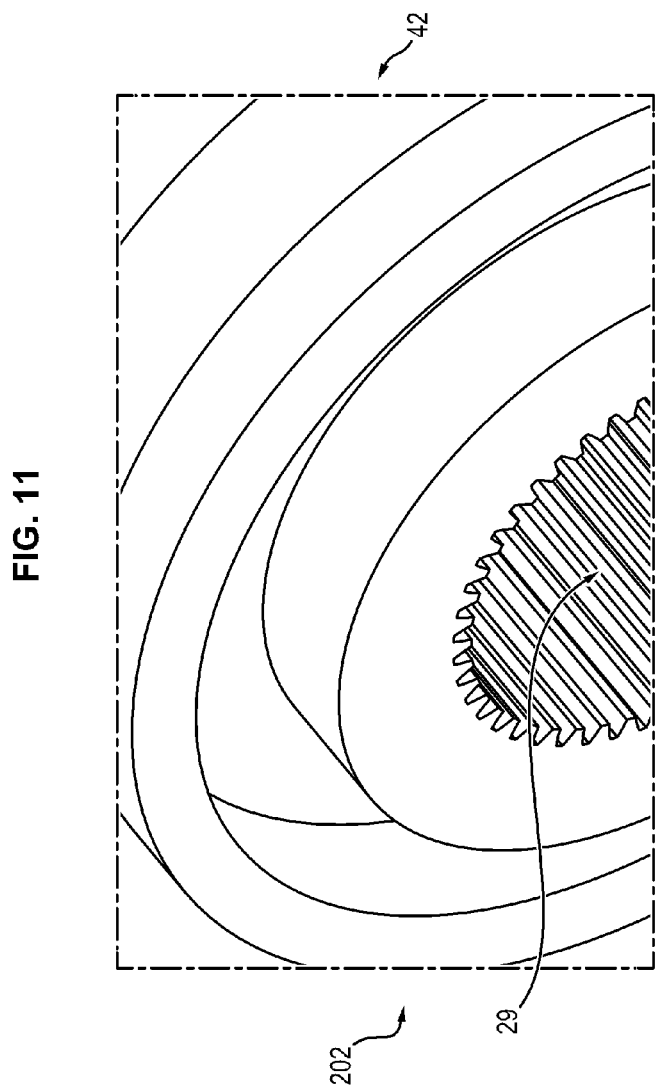

As illustrated in FIGS. 3 to 5, the machine 102 comprises in this embodiment a third guide bearing 37.

The third bearing 37 comprises a frustoconical bushing. It is a solid part that does not comprise movably mounted portions with respect to each other unlike a rolling. Particularly, it has two outer 21 and inner 23 frustoconical main faces, both delimited by two common axial end circular edges forming respectively the small and large diameters of the cone.

This bearing 37 is directly in abutment against the casing 10 and the cylinder block 42, each time along the direction of the axis O-O and along a direction radial to the axis. In the present case, it is in abutment through its outer face 21 against a frustoconical face of the casing located at the junction between its axial 11 and radial 9 extensions. Similarly, it is in abutment through its inner face 23 against a frustoconical face of the cylinder block 42.

The first, second and third bearings 26, 28 and 37 are the only bearings for guiding the rotation of the shaft with respect to the casing in the machine. In this embodiment, these three bearings are located on the same side of the cylinder block 42 along the axial direction, namely on the side of the brake and on the side opposite to the distributor 40. The two bearings 26, 28 are one same side of the bearing 37.

The bushing 37 has a slot 39 extending here in a plane radial to the axis, from the first end edge of the bushing to the second one. It also comprises one or several elements 41 for locking in rotation the bushing with respect to a part of the machine, here formed by the casing. These are in the present example two rectangular tabs 41 extending along the axial direction protruding from the edge of the bushing located at the smallest diameter. Naturally, it is possible to vary the number, shape, location and orientation of the rotational blocking elements.

Thanks to this arrangement by means of frustoconical faces, the cylinder block 42, the casing 10 and the bearing 37 are shaped to center the cylinder block with respect to the casing in a form-fitting manner independently of the shaft.

The casing 10 and more specifically at least its face forming a tapered seat in abutment against the bushing is made for example of cast iron or molten or cast steel. The cylinder block 42 is for example made of machined treated steel, possibly after forging. The bushing 37 is for example statically mounted on the casing body 10, that is to say fixed relative thereto. On the contrary, it is slidably mounted, in relative rotation, with respect to the cylinder block 42. Indeed, in this example, the cylinder block 42, made of machined treated steel, is smoother and harder than the rough casting forming the extension 11 of the casing.

Moreover, It can be provided that the smooth tapered bushing 37 meets the following characteristics as regards its composition.

Firstly, the surface 23 of the bushing 37 which rests on the facing surface in relative rotational displacement, i.e. in this case the seat of the cylinder block 42, is adapted to have a surface condition with a low coefficient of friction. This condition can be obtained by a surface treatment of the face 23 of the bushing. It can also be obtained by choosing the material making up this face. To this end, it may be formed by a synthetic material with a low coefficient of friction or by a material called "sliding" material, for example based on polyvinylidine fluoride (PVDF) or polyetheretherketone (PEEK). The surface can also be loaded with sliding particles, such as bronze particles or pieces of a fluorinated synthetic material, for example polytetrafluoroethylene.

Secondly, the bushing 37 can be composed of a core, for example a steel core, on which a layer of material with a low coefficient of friction as mentioned above is deposited, where appropriate with the interposition of an intermediate layer adapted to ensure the adhesion of the surface layer with a low coefficient of friction. Such an intermediate layer can be formed based on bronze, for example bronze balls, or on porous sintered material, for example agglomerated material fixed to the core for example by fusion. The surface layer with a low coefficient of friction can be printed or impregnated on the intermediate layer, which is preferably porous. The bushing is then formed of a three-layer structure.

As a variant, the bushing 37 can be formed by deposition of the material with a low coefficient of friction or "slip material", for example made of bronze or synthetic material, directly on the core, for example made of metal, in particular steel. In this case, the aforementioned intermediate layer is omitted. The bushing 37 is then formed of a two-layer structure.

As another variant, it can be single-layered in a solid material with a low coefficient of friction, for example in solid bronze.

Phosphor bronzes are particularly able to slide on steel.

Preferably, the bushing 37 is for example formed by tapered rolling from a metal flank.

Once formed, the angular opening of the bushing is preferably comprised between 30 and 60°, for example on the order of 45°. By "angular opening of the bushing" is meant the angle formed between the axis O-O of the machine and the frustoconical faces of the bushing.

Figure 6:
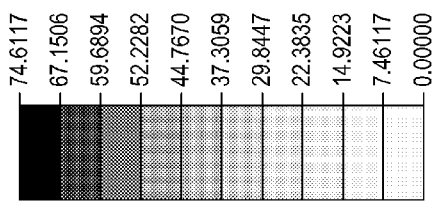
FIG. 6 is a perspective view showing the distribution of the contact pressures on the bushing.
Figure 6:
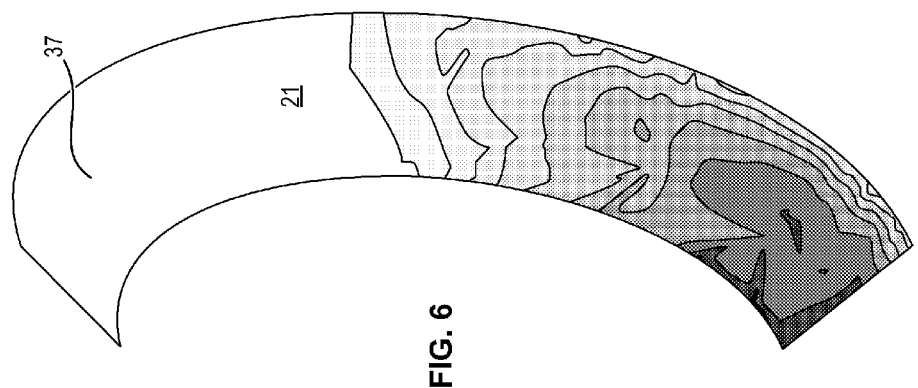

Thanks to this arrangement, a strong reduction in the axial offset of the cylinder block on the shaft is observed. In addition, the frustoconical faces in abutment on the bushing allow optimizing the contact pressures on the latter. The bushing thus oriented tends towards an abutment normal to the trajectory of the cylinder block when it is subjected to a parasitic force, thus allowing to optimize the contact pressures on the bushing. FIG. 6 illustrates an outline of a calculation of these contact pressures when a pressure of 450 bars (namely $450.10^5$ Pa) is applied to the machine, operating as a motor. It is observed that the pressure is almost zero on more than half of the bushing (by defining halves on either side of a radial plane) and in the other half exceeds 50 bars ($50.10^5$ Pa) only on a short circumferential segment of the bushing, here at the bottom of the figure. In addition, the edge effects are not very intense. The bushing therefore properly takes up the distribution forces and the parasitic forces transmitted directly by the cylinder block, and this despite the sliding mounting of the cylinder block on the shaft. The two bearings 26, 28 therefore do not receive the parasitic forces by the shaft.

Such a machine can equip a machinery, forming a vehicle or a construction machinery.

It can be provided, as a variant, that the bushing has at least one recess passing through a thickness of the bushing and intercepting at most one end edge of the bushing. Such a recess promotes good distribution of the lubricating liquid on the two faces 21, 23 of the bushing during operation of the machine.

SECOND EMBODIMENT

A second embodiment of the invention based on FIGS. 7 to 11 will now be presented. Only the characteristics which differentiate this embodiment from the previous one will be described, the others being unchanged.

In this machine 202, the tapered bushing is replaced by two bearings 43, 44.

The third bearing 43 is flat and directly in axial abutment against the radial extension 9 of the casing and the cylinder block 42. It is formed by a roller or needle bearing in which the rollers or the needles extend along the same plane perpendicular to the axis. In this example, the bearing 43 is received on a shoulder formed in the face of the cylinder block 42 directed towards the brake and facing the casing, the shoulder passing through a central recess of the bearing. It is also in axial abutment against a face of the casing directed towards the cylinder block.

The fourth bearing 44 is in abutment against the casing 10 and the cylinder block 42 along a radial direction. It is formed by a cylindrical bushing without inner movable portions. This bushing is in abutment through its inner face against a cylindrical face of the cylinder block and through its outer face against a cylindrical face of the radial extension 9 of the casing.

Thus, the third bearing 43 forms an axial stop and takes up the axial forces transmitted by the cylinder block. This avoids disturbing the bearings 26, 28. The choice of a roller or needle bearing does not penalize the length of the motor.

The fourth bearing 44 forms a recentering stop and takes up the radial forces. It prevents the cylinder block from transmitting bending forces to the shaft, in particular in the case where the shaft is relatively long.

The axial and radial abutment functions which were provided jointly by the bushing in the previous embodiment are therefore this time ensured respectively by separate members 43, 44.

This time it is the four bearings 26, 28, 43 and 44 that are all on the same side of the cylinder block 42 as the brake. The two bearings 26, 28 are on the same side of the bearings 43, 44. These last two, in this example, are intercepted by the same radial plane.

Of course, many modifications may be made to the invention without departing from the scope thereof.

The invention claimed is:

1. A rotating hydraulic machine comprising:
   a casing,
   a shaft rotatably mounted with respect to the casing,
   a sleeve immobilized with respect to the shaft,
   the sleeve being rigidly fixed to the shaft by a first end of the sleeve,
   the sleeve having a second end extending around at least a portion of the casing,
      a cam immobilized with respect to one among the casing and the shaft,
      a cylinder block immobilized in rotation with respect to the other among the casing and the shaft,
   the cylinder block comprising pistons configured to cooperate with the cam to generate a relative rotation between the shaft and the casing,
      first and second guide bearings each directly in abutment against the casing and the sleeve,
   the first and second guide bearings extending around the portion of the casing,
      at least a third guide bearing directly in abutment against the casing and the cylinder block, and
      a power take-off,
   wherein the first and second guide bearings and the power take-off are located on opposite sides of the second end of the sleeve.

2. The machine according to claim 1, wherein the cylinder block is slidably mounted on splines of the shaft.

3. The machine according to claim 1 comprising a brake interposed between the casing and the sleeve, the brake comprising first disks in engagement with the sleeve and second disks in engagement with the casing.

* * * * *